M. PREUSS.
ELECTROMAGNETIC CLUTCH.
APPLICATION FILED FEB. 6, 1920.
1,387,902.
Patented Aug. 16, 1921.
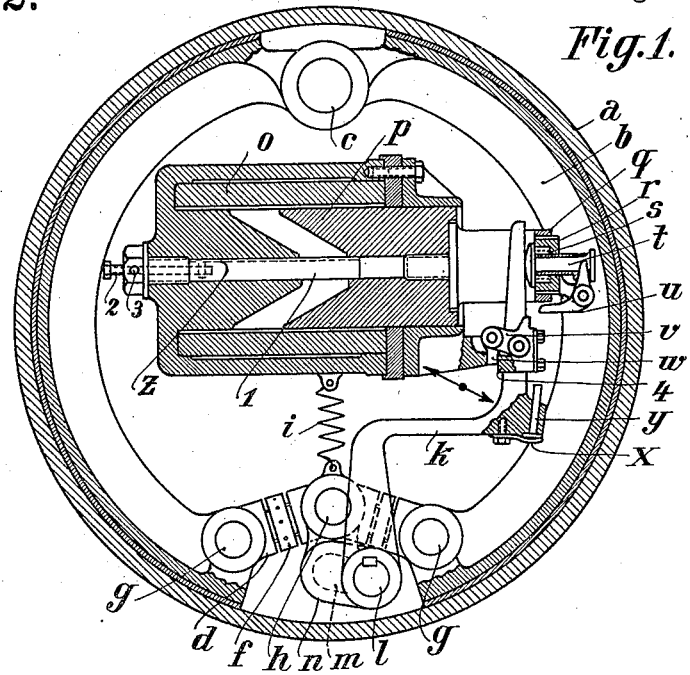
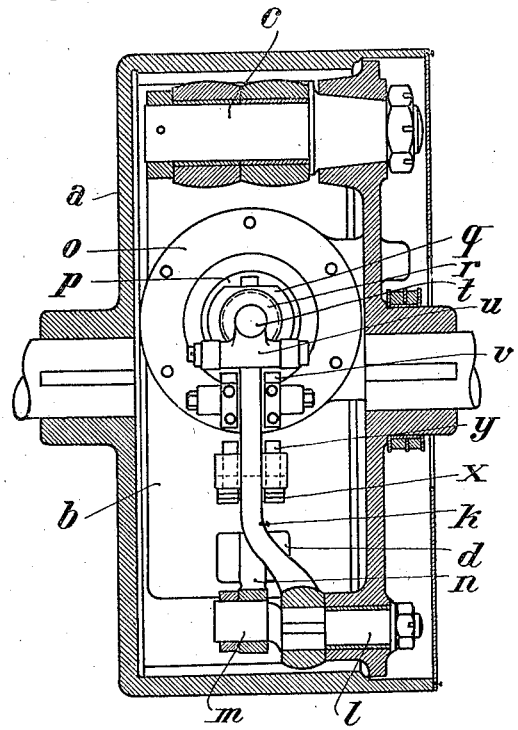
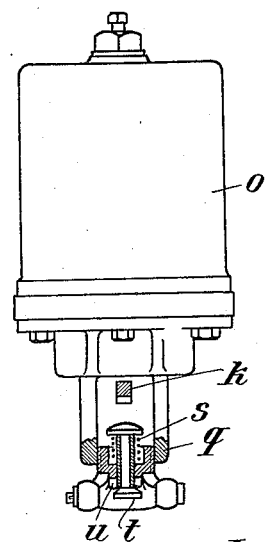
Inventor:
Max Preuss
By [signature]
Attorney.

UNITED STATES PATENT OFFICE.

MAX PREUSS, OF CHARLOTTENBURG, GERMANY.

ELECTROMAGNETIC CLUTCH.

1,387,902.    Specification of Letters Patent.    Patented Aug. 16, 1921.

Application filed February 6, 1920. Serial No. 356,667.

*To all whom it may concern:*

Be it known that I, MAX PREUSS, a citizen of Germany, residing at Tauroggenerstrasse 1, Charlottenburg, Germany, have invented certain new and useful Improvements in Electromagnetic Clutches, of which the following is a specification.

This invention relates to improvements in electromagnetic clutches of the type in which the magnets are excited only on engagement and disengagement of the clutch.

Hitherto in contrivances of this type the magnet armature was inseparably connected to the friction members so that the latter were forced to participate in all the movements of the armature.

The main feature of this invention substantially consists in interposing between the magnet and the friction members a power transmitting gear, for instance a lever mechanism, which is separate from but adapted to be actuated by the magnet. By this means the transmission gear, or the friction members, can be themselves locked directly in the engaged position, whereas the magnet armature or core can return into its initial position independently of the transmission gear and of the friction members. For this reason therefore the same magnet may also be used for performing other functions, for instance releasing the lock and, if necessary, for retracting the friction members from the friction surfaces.

The clutch according to this invention has the substantial advantage of a low consumption of current, as the magnet is energized only at the time of engagement or disengagement of the clutch. In consequence of the long stroke of the magnet rendered possible by the transmission gear, and the damping which can be employed in connection with this long stroke, a slipping may take place if desired, between the friction jaws and the friction surfaces, when engaging the clutch and consequently a smooth clutching is effected.

The power transmission gear further renders possible the employment of a comparatively small energizing coil, which, as compared with magnets with permanent energization can be overloaded to a considerable extent. If the engagement and disengagement of the clutch are effected by means of one and the same magnet the cost and the weight of the clutch are kept low, this being rendered possible for instance in the following manner:—

On the first actuation of the magnet, that is to say during engagement of the clutch, a catch on the magnet or on the stop of the same is so adjusted that the magnet, on its second actuation releases the lock which holds the clutch in its engaged position.

The member acting upon the clutch control lever is preferably resilient and is provided with a stop or abutment which, on the control lever being moved in to its engaged position and after it is locked in this position, resiliently adjusts itself owing to the release of the said member from the said control lever, so that on another actuation of the magnet the stop actuates a device to release the locking member.

One form of carrying the invention into effect is shown by way of example in the accompanying drawings, in which—

Figure 1 is a transverse section, and

Fig. 2 a longitudinal section through the improved clutch, whereas Fig. 3 is a sectional side elevation of the magnet.

In carrying the invention into effect as shown in the drawings friction jaws $b$ are pivotally mounted on the pin $c$ inside the friction drum $a$. The friction jaws $b$ are acted upon by toggle levers $d$, the lengths of which may be adjusted by means of screws $f$. The levers $d$ are pivotally connected by pins $g$ to the friction jaws, and to each other by a pin $h$. A spring $i$ is attached to the hub portion of the said pin $h$, which spring retracts the friction jaws from the friction surfaces. The friction jaws $b$ are pressed into their engaged position by means of a resilient control lever $k$. This latter is keyed on the pin $l$ which is pivotally mounted in the clutch casing and carries a link $n$ on the cranked portion $m$, the other end of which link engages the pin $h$ of the toggle levers $d$.

The control lever is moved into the engaged position, is locked and unlocked by the magnet which consists of a solenoid $o$ and a core $p$. A sliding pin or latch $y$, held by a spring $x$ in a hole in the control lever $k$, is adapted to catch behind a locking edge 4 on the casing or frame of the solenoid, when the lever is moved into the engaged position, i. e. the position corresponding to the application of the friction jaws, so that the lever is thereby locked in this position. The magnet core $p$ engages with the control lever $k$, to move it into the engaged position, through the medium of a catch $q$ the effective face of which may be adjusted by means of a screw $r$.

In the screw $r$ a pin $t$ is adjustably mounted so that it may move axially against the action of a spring $s$. The end of the pin $t$ actuates a trip lever $u$.

A bell-crank lever $v$, pivotally mounted on the solenoid, has a tappet $w$ adapted to depress the locking pin $y$, against the spring $x$ when the control lever is to be unlocked or released.

The air space between the solenoid $o$ and the magnet core $p$ communicates with the atmosphere by means of the bore $z$ of the pin 1, which at the same time acts as stop for the magnet core $p$. The opening 3 to the bore is adjusted by means of a screw 2. By adjusting the screw 2 and thus throttling more or less the issuing air, the movement of the core $p$ and hence the pressure of the friction jaws may be varied as desired.

The electric current is fed to the electromagnet by suitable wires connected to contact rings and brushes.

The operation of the apparatus described is as follows:—

When the electrical circuit is closed the magnet is energized and the core $p$ is attracted. Its motion which is delayed by the adjustable air throttle (air passages $z^3$) is transmitted by the catch $q$ to the control lever $k$, which through the intermediary of the toggle levers $d$ moves the friction jaws into their engaged position against the action of the spring $i$. In consequence of the pressure between the control lever $k$ and the catch $q$ the spring $s$ is kept compressed, so that the pin $t$ and the bell crank lever $u$ retain the position shown in Fig. 1. In the final position the locking pin $y$ springs behind the projection 4 and thus locks the control lever.

When the electrical circuit is opened the magnet core returns to its initial position under the action of centrifugal force, also owing to the air pressure existing between the solenoid and the core and, if desired, under the action of a spring which is not shown. The pin $t$ acted upon by the released spring $s$ assumes the position shown in Fig. 3. The bottom arm of the trip lever $u$ is moved by this means in a downward direction.

On a second energization or actuation of the magnet the trip lever $u$ collides with the upwardly pointing arm of the lever $v$. By this means the tappet $w$ is pressed downward, so that it presses back the pin $y$ against the action of the spring $x$. The pin $y$ can now pass without difficulty over the locking edge 4 so that the control lever $k$ under the action of the spring $i$ can return into the disengaged position.

The improved clutch is particularly suitable for use with machine tools, as by using suitable contacts a wide range of adjustments is possible. It is also applicable for use with motor boats, distant control of mining and mill machinery and other like purposes.

I claim as my invention:—

1. An electro-magnetic clutch comprising two frictional clutch members, one of said clutch members having a friction surface and the other having friction jaws adapted to engage with said surface, an electro-magnet for moving said friction jaws into engagement with said surface, power transmission mechanism interposed between said magnet and said friction jaws, said magnet being separate from said transmission mechanism but adapted to engage therewith to apply said friction jaws to said surface, and means for locking said friction jaws in engagement with said surface.

2. An electro-magnetic clutch comprising two frictional clutch members, one of said clutch members having a friction surface and the other having friction jaws adapted to engage with said surface, an electro-magnet for moving said friction jaws into engagement with said surface, power transmission mechanism interposed between said magnet and said friction jaws, said magnet being separate from said transmission mechanism but adapted to engage therewith to apply said friction jaws to said surface, means for locking the said friction jaws in engagement with said friction surface, and means operable by said magnet for unlocking said locking means, whereby on one energization of the magnet the clutch is engaged and on a succeeding energization of the magnet the clutch is disengaged.

3. An electro-magnetic clutch comprising two frictional clutch members; means for engaging and disengaging said members comprising an electro-magnet and power transmission mechanism separate from said magnet but adapted to be actuated thereby; a lock for locking said transmission mechanism when said members are engaged, after one energization of said magnet; and means operable by said magnet for releasing said transmission mechanism on a second energization of said magnet.

4. An electro-magnetic clutch comprising two frictional clutch members; means for engaging and disengaging said members; said means having a control lever, an electro-magnet having a core separate from but adapted to engage with and move said lever to effect engagement of the clutch when said core is attracted on one energization of said magnet; a lock for locking said lever in the engaged position; means for moving and disengaging said core from said lever when the magnet is deënergized;

and means for releasing said lock when said core is again attracted by said magnet on a succeeding energization thereof.

5. An electro-magnetic clutch comprising two frictional clutch members; means for engaging and disengaging said members; said means having a control lever, an electro-magnet having a core separate from but adapted to engage with and move said lever to effect engagement of the clutch when said core is attracted on one energization of said magnet; a lock for locking said lever in the engaged position; means for moving and disengaging said core from said lever when said magnet is deënergized; and a lock releasing device, said device being adapted to be held in an inoperative position when said core engages said control lever, said releasing device having resilient means for moving it into an operative position when said core is out of engagement with said lever.

6. An electro-magnetic clutch comprising two frictional clutch members; means for engaging and disengaging said members, said means having a control lever; an electro-magnet having a core separate from but adapted to engage with and move said lever to effect engagement of the clutch when said core is attracted on one energization of said magnet; a lock for locking said lever in the engaged position; means for moving and disengaging said core from said lever when the magnet is deënergized; and means carried by said core for causing the release of said lock when said core is again attracted by said magnet on a succeeding energization thereof, said core having an adjustable abutment for engagement with said control lever.

7. An electro-magnetic clutch comprising two clutch members, one of which is in the form of a drum, and the other carries two hinged friction jaws adapted to engage with said drum; a spring for disengaging said jaws; mechanism for moving said jaws into engagement with said drum, said mechanism having a pivoted control lever; an electro-magnet having a core for actuating said lever, the casing of said magnet having a locking edge, a resilient catch on said lever adapted to engage behind said edge when the lever is in the engaged position; means carried by the casing of said magnet for disengaging said catch, releasing means carried by said core for operating said catch disengaging means, said releasing means being adapted to be held in an inoperative position by the control lever when engaged by said core.

In testimony whereof I have signed my name to this specification in the presence of two subscribing witnesses.

MAX PREUSS.

Witnesses:
 H. W. BEYER,
 H. P. BEYER.